Oct. 23, 1945.  E. J. WILSON, JR  2,387,313
SWITCH ELECTROLYTE
Filed Feb. 7, 1944
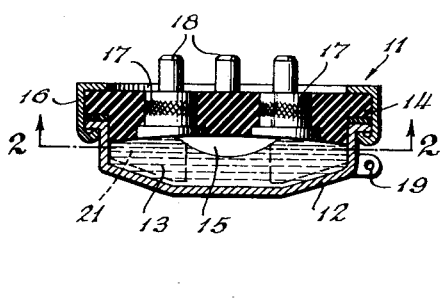
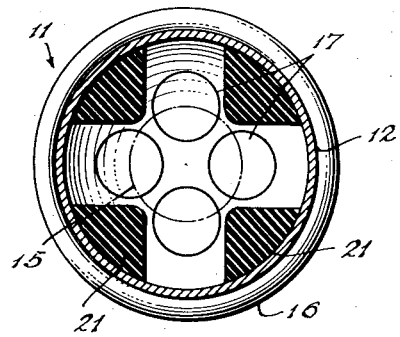
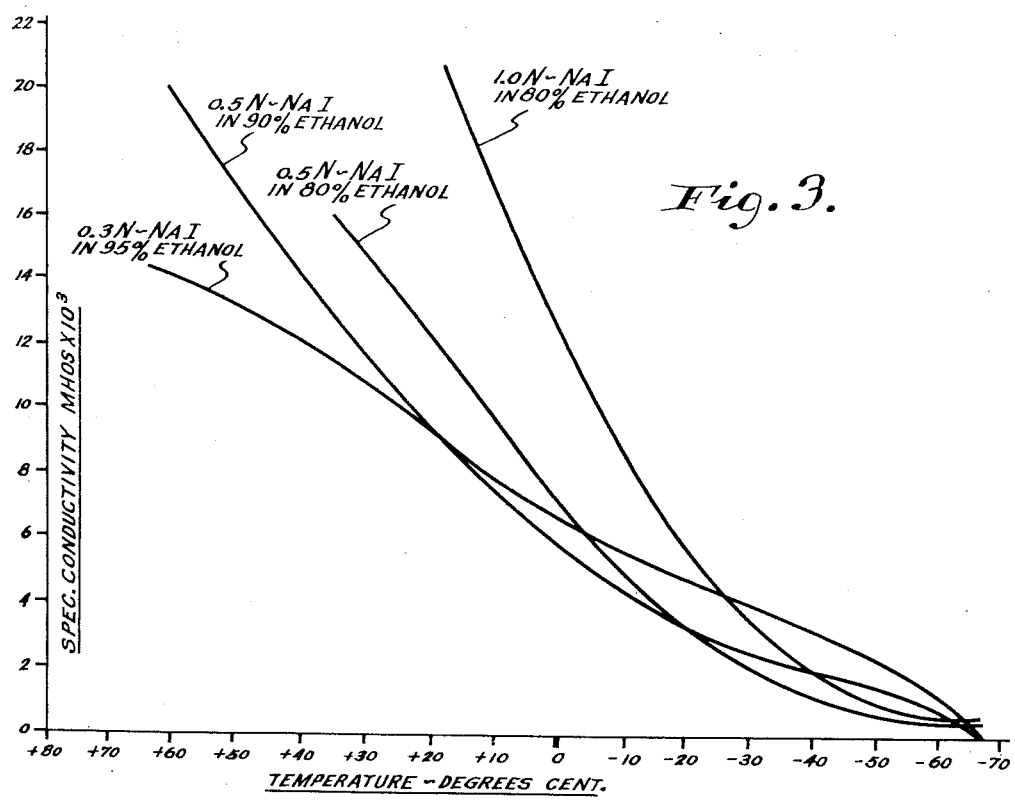
INVENTOR
E. J. WILSON, JR.
BY
ATTORNEY.

Patented Oct. 23, 1945

2,387,313

UNITED STATES PATENT OFFICE 2,387,313

SWITCH ELECTROLYTE

Elwood J. Wilson, Jr., Garden City, N. Y., assignor to Sperry Gyroscope Company, Inc., a corporation of New York Application February 7, 1944, Serial No. 521,369

3 Claims. (Cl. 200—152)

This invention relates to switches and more particularly to electrically conducting mixtures useful in liquid level switches and the like.

Switches of this type ordinarily comprise a receptacle partially filled with an electrically conducting medium, but having an air bubble disposed at the top of the receptacle for engagement with one or more electrodes according to the orientation of the receptacle. Tilting the receptacle causes the bubble to shift in the manner of a spirit level and exposes more or less of the electrode surface to the electrolyte. One form of such switch is used on aircraft instruments, specifically to control the erection of vertical gyroscopes. A number of electrodes are used, spaced about the cover of the switch receptacle, and the respective erecting devices are controlled by the differential current flow to the respective electrodes, as the bubble shifts in response to tilting of the device.

The requirements of an ideal electrolyte are quite numerous and exacting, among which the following may be mentioned:

(1) Because of the wide range of temperatures encountered in the normal use of aircraft, the electrolyte solution must remain liquid over a temperature range of —65° C. to +80° C. or even higher with minimum viscosity and surface tension.

(2) The conducting material, or dissolved salt must have a sufficient specific conductivity to convey the required amount of control current.

(3) The dissolved salt or the like must be used in such small quantities as not to increase the viscosity unduly or to crystallize out at low temperatures.

(4) The salt must be chemically stable in solution over the entire temperature range.

(5) The solution must not be corrosive on the switch or contacts.

(6) The electrolyte should have a relatively flat temperature coefficient of resistance.

(7) The conductivity of the solution must not be too high or the air bubble may leave a conductive film on the contacts, decreasing the sharpness of the switching action.

All of the foregoing requirements have been satisfactorily met by the electrolyte herein described and claimed, and it is the principal object of this invention to provide an improved liquid level switch, and an electrolyte therefor satisfying the foregoing seven requirements. The invention is herein described as applied to a switch of the type appearing in my application, Serial No. 495,298, filed July 19, 1943, jointly with John R. Muma and Robert Haskins, Jr.

In the drawing:

Fig. 1 is a vertical sectional view through one form of switch with which the electrolyte may be used;

Fig. 2 is a cross-sectional view taken on the line 2—2 of Fig. 1; and

Fig. 3 is a graph showing the conductivity of various electrolytes over a required temperature range.

The electrolyte consists principally of alcohol to satisfy the requirement for extreme fluidity over the range of from —65° C. to +80° C. Although various alcohols and related solvents have been tried with varying degrees of success, the simpler aliphatic mono-hydroxy alcohols, such as ethanol and methanol, have been found most desirable. Ethanol boils at approximately 79° C. and is preferred for that reason to methanol, whose boiling point is appreciably lower, that is, 66° C. Other solvents having the power to enable ionization to take place, but with a vapor pressure as high as, or higher than, methanol, are less satisfactory for the reason that they develop unnecessarily high pressures within the switch by boiling at relatively low temperatures. Alcohols of lower vapor pressure, such as propanol, have poor solubility characteristics and are relatively viscous, and hence do not provide good conductivity or a clean quick break in the current flow when the electrode is uncovered.

Ethanol-water mixtures, comprising alcohol at 80% or greater concentration, have been used successfully. The nature of the solute is not critical provided that there is a reasonable compliance with the previously enumerated requirements. Because of their relative stability and non-corrosive action on the switch contacts, halogens of the alkali group have been used successfully. The iodides are preferred over the chlorides and bromides, because of their higher solubilities and resulting higher conductivities. Sodium and potassium chlorides do not dissolve in sufficient concentrations to provide an appreciable current flow, but may be used where current densities are small. Iodide of sodium has been found superior to the iodide of potassium and other metals of the alkali group, because of its relative cheapness, or because it has greater solubility. Sodium iodide satisfies all of the requirements of a desirable electrolyte, and appears superior to most of the other solutes tested.

It will be appreciated that salts having the general character of sodium iodide may be substituted to provide the necessary conductivity in the electrolyte. Magnesium chloride has been tried, but has been found unstable at high temperatures, resulting in the formation of magnesium oxide and the liberation of hydrochloric acid. Of the various other solutes employed with success may be mentioned sodium and potassium thiocyanate, and trimethyl amine hydrochloride. All of the foregoing salts were employed in concentrations in the approximate range of from 0.1 N to 1.5 N solutions, and provided satisfactory results, in most instances. For the particular switch shown in Figs. 1 and 2, concentrations of approximately 0.3 N sodium iodide in ethanol worked very well. Adequate conductivity is provided ordinarily if the salt is soluble to the extent of several percent in approximately 80% alcohol at —65° C. Corrosion may be minimized if the metallic ions liberated by the salt are high in the electro-motive series, and if the metal forming the contacts is low in the series. As is apparent from Fig. 3, the electrolytes containing the most water and solute are the most conductive in the operating range above 0° C. These solutions provide higher current concentrations with reduced heating in the switch.

A typical switch, as disclosed in Figs. 1 and 2, comprises a receptacle 11 preferably formed of a metallic cup 12 containing the electrolyte 13. An insulating cover 14 preferably formed of glass or molded composition material hermetically closes the cup 12 to form a completely enclosed chamber, filled by the electrolyte except for an air bubble 15. The cover 14 is made with a concave inner surface forming a sloping roof for the cup 12, so that the bubble 15 seeks the highest position in the manner of a spirit level. The cup 12 and cover 14 may be sealed together by a ferrule 16 which may be rolled under an annular flange on the cup 12 as indicated in Fig. 1.

At least one, and preferably four or more electrodes 17 are molded directly in the cover 14 with contact surfaces exposed to the electrolyte 13. The electrodes 17 correspond to switch contacts and provide a path for current to flow from the electrolyte 13. Terminals or pins 18 may project from the electrodes 17 in the manner of radio tube socket connections, to provide means for mounting the unit and for conducting the current from the electrodes. When a plurality of electrodes are used, they preferably are symmetrically disposed about the inner surface of the cover as illustrated in Fig. 2, so that the bubble 15, illustrated in broken lines, intercepts equal areas of each electrode when the receptacle is in the normal or level position. Current may be conducted to the electrolyte through the cup 12, as by means of terminal lug 19, and the current flows to each of the electrodes according to the resistance of the respective paths. The principal resistance in each path is provided by the reduced contact area at the exposed surface of each electrode as a result of the bubble 15 insulating a portion of each contact surface. Accordingly, when the receptacle is level, the bubble occupies a central space in the receptacle, and equal portions of all contact surfaces are covered by the bubble 15, in which event the same current flows through each electrode 17.

As the receptacle departs from the level position, the bubble moves toward the high side of the container, as it does in a spirit level, and at least one electrode 17 will have a larger surface exposed to the electrolyte and will receive a larger portion of the current than will the diametrally opposite electrode. Accordingly, the current flow from the respective electrodes is a function of the position of the switch. The switch action provides a complete on and off action following a gradual variation in the current flow in the manner of a variable resistor. Bosses 21 may depend from the insulating cover 14 to guide the bubble in the general directions of the electrodes.

In a typical installation, the entire unit shown in Fig. 1 connects on the base of the rotor element of a vertical gyro. The current flowing from the respective terminals 18 of opposite pairs of electrodes flows through the respective field windings of a reversible erection motor serving to maintain the gyro in a vertical position against the action of drift. A typical illustration of this application of the invention is disclosed in application Serial No. 448,980 entitled Erecting means for gyro vertical instruments, filed June 29, 1942, by Robert S. Curry, Jr., and assigned to the assignee of the present invention.

Although the tendency is to use less concentrated alcohol in order to obtain greater conductivity, some undesirable effects may result from a solvent of this type. Experiments have shown that an electrolyte composed of sodium iodide in 80% ethanol behaves unstably if the current concentrations cause any appreciable heating. For example, a switch containing such an electrolyte properly may produce reduced current flow through the partially insulated electrode immediately following a tilting of the switch such that the bubble covers a larger part of the electrode surface. Shortly thereafter, however, without change in the bubble position, the current might return to and even increase over the original normal density characterizing the level position. This erratic operation was investigated and the cause finally attributed to the evaporation of minute amounts of the alcohol from the film on the electrode exposed to the bubble. With alcohol at concentrations of 80%, it was conjectured that this evaporation into the bubble increased the percentage of water in the film and adjacent solvent, resulting in a substantial increase in the conductivity of the path through the film to the electrode even though the area contacted by the electrolyte was reduced. Acting on this hypothesis, azeotropic or constant boiling mixtures of ethanol and water were substituted, since these mixtures evaporate without changing the proportions of the residual solvent. No such further trouble was experienced and ample current concentrations were obtained even though the increased alcohol concentration resulted in a reduction of the ionization of the solute. In the case of ethanol, an azeotropic mixture comprises approximately a 95% concentration; the nearer this concentration is observed, the more completely the foregoing erratic action is overcome.

It was felt at first that a 95% concentration of ethanol would not ionize sufficiently with the salt to provide satisfactory conductivity, but this was found to be untrue. Even more unusually, it was found that in the low temperature portion of the range, higher specific conductivities were obtained with only 0.3 N iodide, than were obtained with electrolytes having larger percentages of water or solute. Although an electrolyte of 95% ethanol provides somewhat lower conductivity at the higher temperatures, that is, above 0° C., the overall effect is beneficial in that such an electrolyte has a much smaller temperature coefficient of resistivity and minimizes the temperature compensation requirements in the control circuit. This is clearly suggested in Fig. 3 wherein the curve comprising 0.3 N sodium iodide and 95% ethanol is the flattest curve of the entire group of curves and, in fact, closely approximates a straight line function. This contrasts with the remaining curves whose conductivity increases substantially as a power function of temperature.

Concentrations of ethanol in excess of 95% may be used, though with a reduction in the ionizations obtainable. The 95% solution is desirable additionally because it is quite readily obtainable and because a solution containing sodium iodide has a conductivity that gradually approaches a limit at approximately 80° C. Since the solution is hermetically sealed in a container adapted to withstand appreciable pressures, the device is capable of operation at temperatures in excess of 80° C., the boiling point at atmospheric pressure. With a switch of the general proportions shown in Figs. 1 and 2, and having an outside diameter of the order of one inch, total current flow through the switch amounted to over 100 milliamperes, and the differential between opposite electrodes reached as high as 50 milliamperes.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. A liquid level switch comprising a closed receptacle containing an electrolyte, electrode means within said container having a surface adapted to contact said electrolyte to provide a current-conducting path from said electrolyte to said electrode means, said electrolyte comprising ethanol and water containing an iodine of an alkali metal at a concentration in the range 0.1 N to 1.5 N.

2. A variable electrical resistor effective over a wide temperature range comprising a hermetically-sealed receptacle, an electrolyte in said receptacle, electrode means in said receptacle for contacting said electrolyte and for conducting current therefrom in accordance with the area of said electrode means in contact with said electrolyte, said electrolyte comprising a 95% concentration of ethanol containing 0.3 N sodium iodide.

3. A liquid level switch effective over a temperature range of $-65°$ C. to $+80°$ C. comprising a receptacle filled with an electrolyte save for an air bubble movable along the top of said receptacle according to the orientation of said receptacle, at least one electrode adjacent to said top and having an exposed surface contacting said electrolyte to provide current flow at portions free of said bubble, said electrolyte comprising an azeotropic mixture of ethanol and water rendered conductive by the addition of sodium iodide at concentrations in the range of 0.1 N to 1.5 N, said mixture maintaining uniform proportions of ethanol and water during local heating and evaporation at said electrode.

ELWOOD J. WILSON, JR.

CERTIFICATE OF CORRECTION.

Patent No. 2,387,313.    October 23, 1945.

ELWOOD J. WILSON, JR.

It is hereby certified that error appears in the printed specification of the above numbered patent requiring correction as follows: Page 3, second column, line 6, claim 1, for the word "iodine" read --iodide--; and that the said Letters Patent should be read with this correction therein that the same may conform to the record of the case in the Patent Office.

Signed and sealed this 29th day of January, A. D. 1946.

(Seal)

Leslie Frazer
First Assistant Commissioner of Patents.